US012649397B2

(12) United States Patent (10) Patent No.: US 12,649,397 B2
Pöllinger et al. (45) Date of Patent: Jun. 9, 2026

(54) VEHICLE SEAT WITH BACKREST MADE OF FRAME ELEMENT AND KNITTED FABRIC

(71) Applicant: GRAMMER Aktiengesellschaft, Ursensollen (DE)

(72) Inventors: Thomas Pöllinger, Regensburg (DE); Christopher Neidl, Schmidgaden (DE); Sebastian Wegmann, Regensburg (DE)

(73) Assignee: GRAMMER Aktiengesellschaft, Ursensollen (DE)

(*) Notice: Subject to any disclaimer, the term of this patent is extended or adjusted under 35 U.S.C. 154(b) by 170 days.

(21) Appl. No.: 18/473,433

(22) Filed: Sep. 25, 2023

(65) Prior Publication Data

US 2024/0116419 A1 Apr. 11, 2024

(30) Foreign Application Priority Data

Oct. 6, 2022 (DE) ..................... 10 2022 125 858.0

(51) Int. Cl.
　*B60N 2/70* (2006.01)
　*B60N 2/58* (2006.01)
　*B60N 2/72* (2006.01)
(52) U.S. Cl.
　CPC .......... *B60N 2/7011* (2013.01); *B60N 2/5825* (2013.01); *B60N 2/72* (2013.01)
(58) Field of Classification Search
　CPC .. B60N 2/5833; B60N 2/7011; B60N 2/5825; B60N 2/6025; B60N 2/6036; A47C 7/282
　See application file for complete search history.

(56) References Cited

U.S. PATENT DOCUMENTS

| | | | |
|---|---|---|---|
| 3,125,156 A | * | 3/1964 | Grimshaw ............. A47C 7/282 |
| | | | 160/382 |
| 5,013,089 A | | 5/1991 | Abu-Isa et al. |
| 6,102,482 A | | 8/2000 | Dettoni et al. |
| | | (Continued) | |

FOREIGN PATENT DOCUMENTS

| | | |
|---|---|---|
| DE | 9101997 | 5/1991 |
| DE | 4303006 | 8/1994 |
| | (Continued) | |

OTHER PUBLICATIONS

Official Action for Germany Patent Application No. 102022125858. 0, dated Jul. 16, 2024, 3 pages.

(Continued)

*Primary Examiner* — Timothy J Brindley
(74) *Attorney, Agent, or Firm* — Sheridan Ross P.C.

(57) ABSTRACT

The invention relates to a vehicle seat having a seat part and a backrest part, in which the backrest part has a frame element enclosing an inner surface and a knitted fabric arranged on the frame element, the frame element having at least one fastening element on each of at least two opposite inner sides and the knitted fabric each having a fastening element formed complementarily thereto and arranged on the backside, wherein the knitted fabric is fastened to the frame element by the fastening elements in such a way that the knitted fabric at least partially embraces the frame element from the outside inwards starting from a front side of the frame element facing the seat part and is substantially completely tensioned.

8 Claims, 19 Drawing Sheets

(56)         References Cited

U.S. PATENT DOCUMENTS

| | | | | |
|---|---|---|---|---|
| 8,465,007 | B2 * | 6/2013 | Coffield | A47C 31/023 |
| | | | | 267/143 |
| 8,777,321 | B2 * | 7/2014 | Masunaga | A47C 7/282 |
| | | | | 297/452.56 |
| 10,407,174 | B2 * | 9/2019 | Cheng | B64D 11/0647 |
| 10,631,651 | B1 * | 4/2020 | Hsu Besner | A47C 4/28 |
| 10,773,616 | B2 * | 9/2020 | Wlassuk | B60N 2/6009 |
| 11,291,310 | B2 * | 4/2022 | Plant | A47C 31/023 |
| 11,541,789 | B2 * | 1/2023 | Robinson | B29C 65/70 |
| 2021/0323454 | A1 * | 10/2021 | Chavez | B60N 2/6063 |
| 2022/0265050 | A1 * | 8/2022 | Wu | A47C 31/023 |

FOREIGN PATENT DOCUMENTS

| | | | | | |
|---|---|---|---|---|---|
| DE | 9416236 | U1 * | 4/1995 | | |
| DE | 102010034645 | | 3/2011 | | |
| DE | 102019210221 | | 1/2021 | | |
| EP | 0063193 | | 10/1982 | | |
| FR | 2999125 | A3 * | 6/2014 | | B60N 2/6018 |
| GB | 918743 | A * | 2/1963 | | A47C 7/282 |
| WO | WO-2010069411 | A1 * | 6/2010 | | B60N 2/72 |
| WO | WO-2019017834 | A1 * | 1/2019 | | |
| WO | WO-2022269061 | A1 * | 12/2022 | | B60N 2/7011 |

OTHER PUBLICATIONS

Extended European Search Report for Europe Patent Application No. 23192488.7, dated Feb. 2, 2024, 9 pages.

Official Action for Germany Patent Application No. 102022125858.0, dated Feb. 10, 2023, 12 pages.

* cited by examiner

VEHICLE SEAT WITH BACKREST MADE OF FRAME ELEMENT AND KNITTED FABRIC

CROSS REFERENCE TO RELATED APPLICATION

This application claims the benefit of German Patent Application No. 10 2022 125 858.0, filed Oct. 6, 2022, the contents of which are incorporated herein by reference in its entirety.

FIELD

The invention relates to a vehicle seat having a seat part and a backrest part, in which the backrest part has a frame element enclosing an inner surface and a knitted fabric arranged on the frame element. Furthermore, the invention relates to an interior device of a transport means, in particular a passenger transport means, having a vehicle seat, as well as to a method for producing a backrest for a vehicle seat.

BACKGROUND

Such vehicle seats are used, for example, in passenger transport means such as trains. Such means of transport are intended and suitable for transporting a plurality of persons and are, for example, rail vehicles or airplanes. Corresponding rail vehicles are for example local and/or long-distance trains, suburban trains, subway trains and the like.

The space available for and around the seat is often limited, especially in such means of transport. There is therefore a need to make the best possible use of the available space. As many passengers as possible should be able to be accommodated in one means of transport. Furthermore, the weight and cost of the vehicle seats play a decisive role, simply because of the large number of seats in such means of transport, and these points in particular are a disadvantage with previous vehicle seats. Also a simple and fast exchangeability of wear parts, such as covers, is particularly relevant, since by the intensive use by a multiplicity of passengers, in addition, by vandalism with an exchange of the covers in regular intervals must be counted on, whereby this presents itself with well-known vehicle seats usually as time and cost-intensive.

SUMMARY

It is the object of the present invention to provide a vehicle seat which overcomes the disadvantages mentioned above. Furthermore, it is the object of the invention to provide an interior device of a means of transport which overcomes the aforementioned disadvantages. Furthermore, it is the object of the invention to provide a method for manufacturing a backrest part for a vehicle seat, which overcomes the disadvantages mentioned above.

The object is solved by the objects a vehicle seat having a seat part and a backrest part, wherein the backrest part comprises a frame element including an inner surface and a knitted fabric arranged on the frame element and the method of manufacturing a backrest part for a vehicle seat.

The core idea of the invention is a vehicle seat with a seat part and a backrest part, in which the backrest part has a frame element which encloses an inner surface, and a knitted fabric arranged on the frame element, the frame element having at least one fastening element on each of at least two opposite inner sides, and the knitted fabric having a fastening element which is formed complementarily thereto and is arranged on the rear side, wherein the knitted fabric is fastened to the frame element by the fastening elements in such a way that the knitted fabric at least partially embraces the frame element from the outside inwards, starting from a front side of the frame element facing the seat part, and is substantially completely tensioned.

The term "substantially" as used herein is intended to be interpreted to mean that minor tolerance variations with respect to a feature are also claimed.

The frame element includes an inner surface. According to the invention, an inner surface is understood to be a material-free or empty surface which is circumferentially bounded by the enclosing frame element.

According to the invention, the knitted fabric represents a seat cover of the backrest, in particular a knitted seat cover. Such a knitted fabric is advantageously produced with a knitting machine. This advantageous use of a knitted fabric allows a high degree of variability in the design of the areas with different elasticities. Such knitted fabrics can advantageously have both flexible and rigid, or firm, sections. Compared to conventional woven fabrics, knitted fabrics can be produced very simply, inexpensively and in a manner specific to the application.

A knitted fabric can be produced by certain yarns, preferably the yarn has at least one of the following properties maximum tensile strength at most 60 N, elongation at most 20% and material polyester or at least partly made of polyester.

It is also conceivable that different knitted fabrics are used, which may have different patterns.

A complementary design of the fastening elements of the frame element and the knitted fabric is understood to be such a design that a permanent, in particular detachable, positive connection between the frame element and the knitted fabric is possible by means of the fastening elements. Furthermore, the complementary design is understood to mean, in addition to the connectivity, also the spatial arrangement of the fastening elements on the frame element and on the knitted fabric, according to which this enables a corresponding connection of the fastening elements with the intended fit of the knitted fabric on the frame element. Accordingly, the number of fastening elements on the frame element and on the knitted fabric is preferably identical, with a fastening element complementary in shape and spatial arrangement to each fastening element on the frame element, or vice versa.

The design of the backrest of the vehicle seat according to the invention with frame element and knitted fabric ensures that no further elements are required for support and/or cushioning, at least in the area of the inner surface. In this way, costs, space and weight can be saved compared to conventional vehicle seats.

Preferably, the vehicle seat described here is a rail seat, i.e. a seat for rail vehicles, such as local and/or long-distance trains, suburban trains, subway trains and the like. According to a preferred embodiment, the knitted fabric is arranged in a free-swinging manner on the front side of the frame element, at least in the area of the inner surface. Preferably, the knitted fabric is arranged in the area of the inner surface on or above the inner surface or in sections on or above and within the inner surface. Preferably, this is also due to the formation of an upholstery support element disposed within the knitted fabric and provides optical and ergonomic advantages. Preferably, the knitted fabric provides the sole support and/or cushioning for a seat user at least in the area of the inner surface. Due to the free-swinging arrangement in the area of the inner surface, the knitted fabric is stretchable backwards into or beyond the inner surface when loaded by a seat user, so that the cushioning and/or support can be provided. Advantageously, the seat cover is designed and intended to withstand the force applied by the seat user. Accordingly, the knitted fabric advantageously has a corresponding stability. Accordingly, no further supporting or cushioning elements are advantageously arranged in the inner surface. In the area of the inner surface, the knitted fabric can be arranged either completely on or above the inner surface. This is particularly the case if no cushioning element is provided in the knitted fabric. The knitted fabric may also be arranged in the area of the inner surface in sections on or above and within the inner surface, this being the case if an upholstery support element is provided.

According to a preferred embodiment, the frame element comprises a continuous upper area for supporting the head and a lower area comprising the inner surface for supporting the back. In contrast to the inner surface, the upper area is thus continuous, i.e. non-material-free, whereby a foam element can also be provided in this upper area for additional padding of the head. Preferably, one inner surface of the upper area borders the inner surface from above and three inner surfaces of the lower area border the inner surface laterally and from below. Further preferably, the frame element has at least one fastening element on each of the inner surfaces bounding the inner surface. Due to this arrangement of the fastening elements, the knitted fabric is advantageously arranged in tension on the frame element. Preferably, the fastening elements on the frame element and the knitted fabric are designed in such a way that the fastening of the knitted fabric to the frame element can be released without being destroyed. Particularly preferably, the fastening between the frame element and the knitted fabric is a releasable positive connection.

According to a preferred embodiment, the fastening elements on the frame element are in the form of hooks, strips, hook-and-loop fasteners, zip fasteners or press studsen. Preferably, several different types of fastening elements or only one type of fastening element are provided. The fastening elements are not intended to be limited to the types mentioned herein. Preferably, the type or types of fastening elements are selected according to the corresponding application. Advantageously, all types of fastening elements have in common that a releasable positive connection is ensured. Preferably, several fastening elements or one continuous fastening element are arranged on each of the inner sides of the frame element, distributed over the length of the inner side. In this way, a particularly stable fastening and also tensionability of the knitted fabric is ensured.

According to a preferred embodiment, the knitted fabric has an upper tubular section with two opening sides. Such tubular knitted fabrics can be regarded as opposing flat structures which are joined together at two outer edges. Advantageously, such a knitted fabric is manufactured using a 3D knitting process. Preferably, a first opening side is closed. In simplified terms, this gives the upper section the shape of a sock, which can be put over very easily. Further preferably, the upper tubular section of knitted fabric is arranged enclosing the upper area of frame element. This design and arrangement of the upper section ensures easy positioning of the knitted fabric on the frame element before the loop lashing is performed by fastening with the fastening elements. Preferably, the knitted fabric has a lower section which is substantially planar and directly front-joins the upper section. Particularly preferably, the lower section contacts the lower area of frame element from the front and, starting from the front of the frame element, at least partially embraces the lower area from the outside towards the inside.

Preferably, the lower section is formed as a flat knit. A flat knitted fabric is a substantially flat structure which is surrounded by outer edges. This flat structure can have any shape, for example polygonal. If the thickness is neglected in the flat knitted fabric, an essentially two-dimensional flat structure can be assumed. In this way, the lower section can be easily adapted to the shape of the lower area of the frame element, so that an at least partially embracing or encompassing attachment of the knitted fabric to the frame element is possible.

According to a preferred embodiment, the complementary fastening elements of the knitted fabric are arranged at the rear edge of the open second opening side of the upper section and at the side and bottom edge of the lower section. By arranging the fastening elements on the knitted fabric, the knitted fabric can be fastened to the fastening elements of all inner sides of the frame element bounding the inner surface. Preferably, the fastening element at the upper section is formed as running continuously along the length of the open second opening side. Further preferably, the fastening elements at the lower section are formed as several fastening elements arranged along the length of the left and right as well as the lower side at the edge.

According to a preferred embodiment, at least two, in particular at least four and particularly preferably six, fastening units are fixedly arranged on the knitted fabric.

Preferably, the fastening units have fastening elements arranged on the knitted fabric and each fastening unit comprises at least one fastening element. Preferably, the fastening units are fastened to the knitted fabric on the edge side, in particular opposite, in particular sewn on, and are formed in a strip-like manner. Further preferably, the fastening units arranged on the fastening units project beyond a base surface of the knitted fabric. Preferably, the fastening units are formed from a different material than the knitted fabric, in particular from a rigid and tear-resistant material. In this way, the fastening units on the knitted fabric are not elastic and provide a firm hold for the fastening units of complementary design on the frame element. Further advantageously, the subsequent attachment of the fastening units and thus the fastening elements allows the position and type of the respective fastening elements to be adapted to the existing conditions or designs of the frame element.

Preferably, at least in the area of the inner surface, an upholstery support element is arranged in or on the knit and is held exclusively by it. Further preferably, the cushion support element is substantially planar. Preferably, the upholstery support element extends substantially parallel to the inner surface. Further preferably, the upholstery support element has a uniform thickness or a varying thickness. If the upholstery support element has a uniform thickness, fabrication and positioning on or in the knitted fabric is particularly easy. In the case of a varying thickness, an additional function can be imprinted on the cushion support element, for example a structure particularly adapted to the back of a seat user. The thickness of the cushion support element refers to an extension of the upholstery support element from front to back, i.e. in the installed state starting from the seat part towards the backrest part or vice versa. Particularly preferably, the cushion support element has a convex lower segment that curves forward toward the seat part and/or a convex middle segment that curves backward. Preferably, the lower segment has a uniform thickness across the width of the cushion support element that tapers upwardly. Also preferably, the middle segment has a thickness that tapers outwardly relative to the width and height. Preferably, the cushion support element has a top segment with a uniform thickness. Preferably, the lower segment of upholstery support element provides support for the lowest lordosis and the middle segment of upholstery support element provides support for the upper lordosis. Due to the above-described design of the upholstery support element, it enables a back-protecting and comfortable sitting posture for a seat user, especially on long journeys.

Preferably, the upholstery support element is attached to the back of the knitted fabric, i.e. on the side of the knitted fabric facing away from the seat part, in particular sewn on, or the knitted fabric is designed as a double-layer knitted fabric at least in the area of the inner surface and has a closable opening on the back, so that a pocket element is provided in the knitted fabric, into which the upholstery support element can be inserted via the opening in the knitted fabric. Preferably, the pocket element is formed complementary to the upholstery support element. Particularly preferably, the dimensions of the pocket element are selected to be smaller than the dimensions of the upholstery support element, so that the knitted fabric is stretched around the upholstery support element in the area of the pocket element when the upholstery support element is inserted. In this way, a safer hold and an improved appearance is ensured. Further preferably, the opening is reversibly closable by means of a locking element, in particular a thread, a hook-and-loop fastener, a zip fasteners or press studs. If the upholstery support element is attached to the back of the knitted fabric, it can be attached subsequently in a particularly simple and material-saving manner. In the version with pocket element, a particularly positionally stable and secure arrangement of the upholstery support element within the knitted fabric is possible, and the upholstery support element is thus protected from damage, for example when attaching or removing the knitted fabric from the frame element. The variants of the locking element mentioned here are not to be regarded as conclusive, and further variants are conceivable. The decisive factor is the reversible non-destructive closability or opening possibility of the opening in order to insert or remove the upholstery support element.

The above preferred design of the upholstery support element and the knitted fabric makes it particularly easy to adapt the upholstery support element to the given dimensions of the seat and the required functionality, whereby the elasticity of the knitted fabric means that such an adaptation of the upholstery support element does not require any changes to the knitted fabric.

Preferably, the lower section of the knitted fabric, on or in which the upholstery support element is arranged, is convex at least in the area of the inner surface towards the front in the direction of the seat part, so that a front convex area is formed, which from the front gives the appearance of an attached cushion. Due to this arrangement, a back of a seat user first comes into contact with the upholstery support element arranged in or on the knitted fabric, so that optimum cushioning and support is ensured.

The object is also solved by an interior device of a means of transport, in particular a passenger transport means, comprising at least one vehicle seat. The vehicle seat can have all the features already described above individually or in combination with each other, and vice versa.

The object is further solved by a method for manufacturing a backrest part for a vehicle seat, comprising at least the following steps:

a. Providing a frame element and a knitted fabric, the frame element having at least one fastening unit on each of at least two opposite inner sides and the knitted fabric having a fastening unit complementary thereto and arranged on the rear side;

b. Placing the knitted fabric against the frame element on a front side of the frame element facing the seat part;

c. Fastening the knitted fabric to the frame element by the fastening units, so that the knitted fabric at least partially embraces the frame element from the outside to the inside;

d. Obtaining the backrest part with the knitted fabric at least partially encompassing the frame element.

The method according to the invention provides a simple and time-saving way of producing a backrest part for a vehicle seat with a frame element and a knitted fabric. In this case, the knitted fabric at least partially surrounds or covers the frame element, so that the knitted fabric at least partially surrounds the frame element from the outside inwards, starting from a front side of the frame element facing the seat part, and is substantially completely stretched.

According to a preferred embodiment, the step b. of applying the knitted fabric to the frame element comprises folding over an upper tubular section of knitted fabric which has two opening sides, a first opening side being closed, the upper tubular section of knitted fabric being arranged to enclose the upper area of frame element, the upper area being continuous and serving to support the head.

According to a preferred embodiment, the step c. of fastening the knitted fabric to the frame element comprises first fastening the fastening units of the knitted fabric arranged at the lower edge of the lower section to the complementary fastening units of the frame element at the lower inner side of the lower area. Then, the fastening units of the knitted fabric arranged at the lower section edge side laterally, i.e. left and right, are fastened to the complementary fastening units of the frame element at the side inner sides, i.e. left and right, of the lower area. Finally, the fastening unit of the knitted fabric at the upper section is then fastened at the rear edge side at the open second opening side of the upper tubular section to the fastening unit at the inner side of the upper area of frame element which bounds the inner surface at the top.

The fastening of the knitted fabric to the frame element may also be referred to as re-tensioning or untensioning, since it is only by the four-sided fastening by the fastening units that the knitted fabric is brought under tension.

All of the features described above for the vehicle seat or interior device, individually or in combination with each other, are also intended to be mutatis mutandis disclosed for the method, and vice versa.

Further advantages, objectives and features of the present invention will be explained with reference to the following description of the appended figures. Similar components may have the same reference signs in the various embodiments.

DETAILED DESCRIPTION

In the figures, identical components are to be understood with the corresponding reference signs. For the sake of clarity, some components may not be marked with a reference sign in some figures, but have been designated elsewhere.

Figure 1:
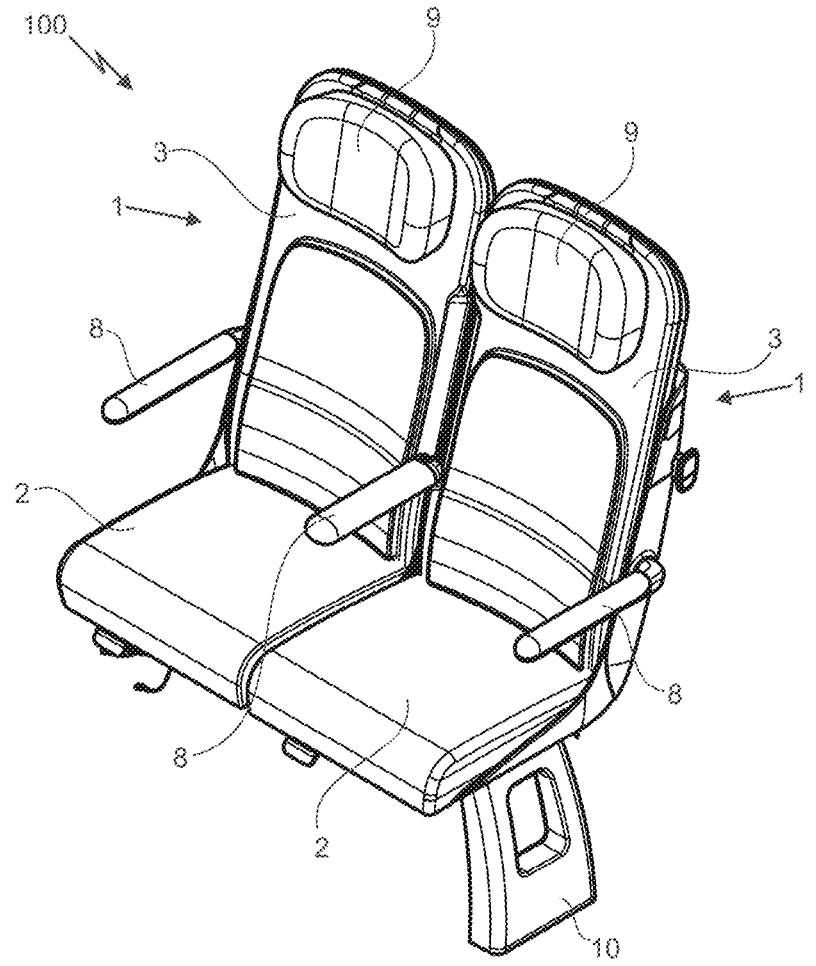
FIG. 1 a perspective view of an interior device according to one embodiment.

FIG. 1 shows a perspective view of an interior arrangement of a means of transport, in this case a train or railroad, in the form of a double track seat comprising two vehicle seats according to the invention, which can have the features of the present application which are essential to the invention. Such an interior device 100 essentially comprises two vehicle seats 1 arranged side by side, each comprising a seat part 2, a backrest part 3, armrests 8, headrests 9 and a cantilever-type seat base 10.

Figure 2:
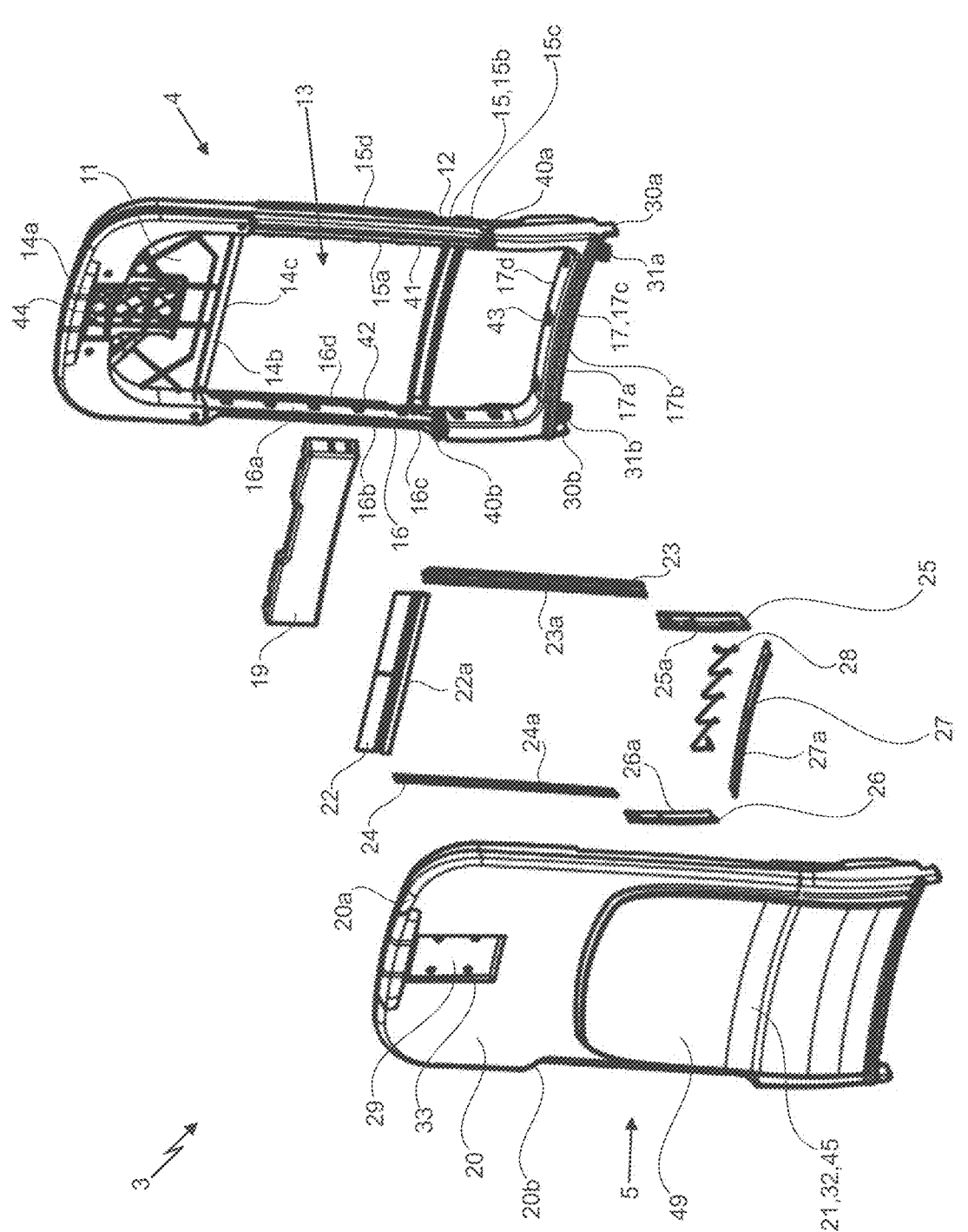
FIG. 2 an exploded view of a backrest part according to one embodiment.

In FIG. 2, the backrest part 3 of a vehicle seat 1 according to the invention is shown in an exploded view.

The backrest part 3 comprises a frame element 4 and a knitted fabric 5 detachably connected thereto, in particular in a form-fitting manner, or attached thereto.

The frame element 4 has an upper area 11 and a lower area 12 connected thereto. The upper area 11 together with the lower area 12 encloses an inner surface 13, the inner surface 13 being exposed, i.e. no further elements of the frame element 4 are arranged there. The inner surface 13 is essentially rectangular in shape.

The upper section 11 has an upper side 14a with two rounded corners and a cross strut 14b with an inner surface 14c, the cross strut 14b or the inner surface 14c closing off the upper section 11 downwardly towards the inner surface 13. The upper area 11 further comprises a headrest fastening 44 to which the headrest 9 can be fastened. Preferably, the headrest 9 is fastened to the frame element 4 by means of screws, so that the headrest fastening 44 has corresponding screw threads. A substantially rectangular foam insert 19 is arranged between the headrest fastening 44 and the cross strut 14b, which serves as padding or support for the shoulders.

The lower section 12 comprises a first side strut 15 having an inner side 15a facing the inner surface 13, an outer side 15b opposite the inner side, a front side 15c facing the seat part 2, and an opposite rear side 15d. The lower section 12 comprises a second side strut 16 having an inner side 16a facing the inner surface 13, an outer side 16b facing the inner surface, a front side 16c facing the seat part 2, and an opposite rear side 16d. The lower section 12 comprises a cross strut 17 with an inner side 17a or upper side 17b facing the inner surface 13, an outer side 17b or lower side 17b opposite the inner side, a front side 17c facing the seat part 2 and an opposite rear side 17d.

A plurality of fastening elements 41 in the form of hooks are formed on the inner surface 15a over the length thereof, which hooks project into the inner surface 13. A plurality of fastening elements 42 in the form of hooks are formed along the length of the inner surface 16a, which project into the inner surface 13. At the inner surface 17a, a plurality of fastening elements 43 in the form of hooks are formed along the length thereof and project into the inner surface 13.

A seat foot connecting element 30a, 30b for connection to the seat foot 10 and a seat part connecting element 31a, 31b for connection to the seat part 2 are arranged laterally (left and right) on the outer side 17b and underside 17b, respectively. The side struts 15, 16 each have a connecting axis 40a, 40b, so that the side struts 15, 16 are formed in two parts, so to speak. This has the advantage that the connected seat part 2 can be moved back and forth and thus only the lower part of the side struts 15, 16 of the lower area 12 moves up to the connecting axes 40a, 40b. Furthermore, a support strut 18 is provided, which is connected at each end to the rear sides 15d, 16d of the side struts 15, 16 and runs behind the inner surface 13. The support strut 18 has a stabilizing effect.

The knitted fabric 5 has an upper section 20 and a lower section 21. The upper section 20 is tubular in shape with a closed upper opening side 20a and an open lower opening side 20b. The upper section 20 is slipped over the upper area 11 of frame element 4 in the attached state. The upper section 20 further comprises a headrest recess 29 with circular recess 33. The headrest 9 is arranged in the area of the headrest recess 29, the recesses 33 being intended for the passage of screws to be fixed in the headrest fastening 44 of the upper section 11.

The lower section 21 is substantially planar in shape and directly joins the second opening side 20b of the upper section 20 at the front. When attached, the lower section 21 contacts the lower area 12 of frame element 4 from the front. Starting from the front side of the frame element 4, the lower section 21 embraces or spans the lower area 12 at least partially from the outside inwards.

Furthermore, in the lower section 21 the knitted fabric 5 is formed as a double-layer knitted fabric 5 at least in the area of the inner surface 13 and has a closable opening 34 at the back, so that a pocket element 45 is provided in the knitted fabric 5, into which an upholstery support element 32 can be inserted via the opening 34 in the knitted fabric 5, the pocket element 45 being formed complementarily to the upholstery support element 32. The upholstery support element 32 is arranged in the area of the inner surface 13 and is substantially planar in shape and extends substantially parallel to the inner surface 13. The knitted fabric 5 and the upholstery support element 32 provide, in the area of the inner surface 13, the sole cushioning and/or support of a back of a seat user without the need or necessity for other elements to be arranged there.

On the back of the knitted fabric 5 are an upper fastening unit 22 with a fastening element 22a extending over the entire length, a first lateral fastening unit 23 with several fastening element 23a distributed over the length, a second lateral fastening unit 24 with several fastening element 24a distributed over the length, a third lateral fastening unit having a plurality of fastening elements 25a distributed along the length, a fourth lateral fastening unit 26 having a plurality of fastening elements 26a distributed along the length, and a lower fastening unit 27 having a plurality of fastening elements 27a distributed along the length. Details of the positions of the fastening units 22, 23, 24, 25, 26, 27 at the rear of the knitted fabric are shown in connection with FIG. 3b below. The fastening elements 23a, 24a, 25a, 26a, 27a are formed as slot-like recesses which are complementary to the hook-shaped fastening elements 41, 42, 43 so—that a releasable positive connection is ensured. The fastening element 22a is strip-shaped and can thus interact with the cross strut 14b or the inner side 14c of the cross strut 14b to form a releasable positive connection. Thus, the cross strut 14b and the inner side 14c are themselves formed as fastening elements or can be referred to as fastening elements 14b, 14c of the frame element 4, the frame element 4 therefore also having this fastening element on the inner side 14c. The lateral fastening units 23, 24, 25, 26 are subdivided on the left and right sides respectively, i.e. into fastening units 23 and 25 and 24 and 26, since the side struts 15 and 16 of the frame element 4 are also subdivided by the connecting axes 40a, 40b, and in this way rotatability about the axis and stable fastening are ensured.

Furthermore, a locking element 28 is shown, which is provided for releasably closing an opening 34 in the knitted fabric 5 (not shown here; see FIG. 3b) in a force-locking manner.

Figure 3A:
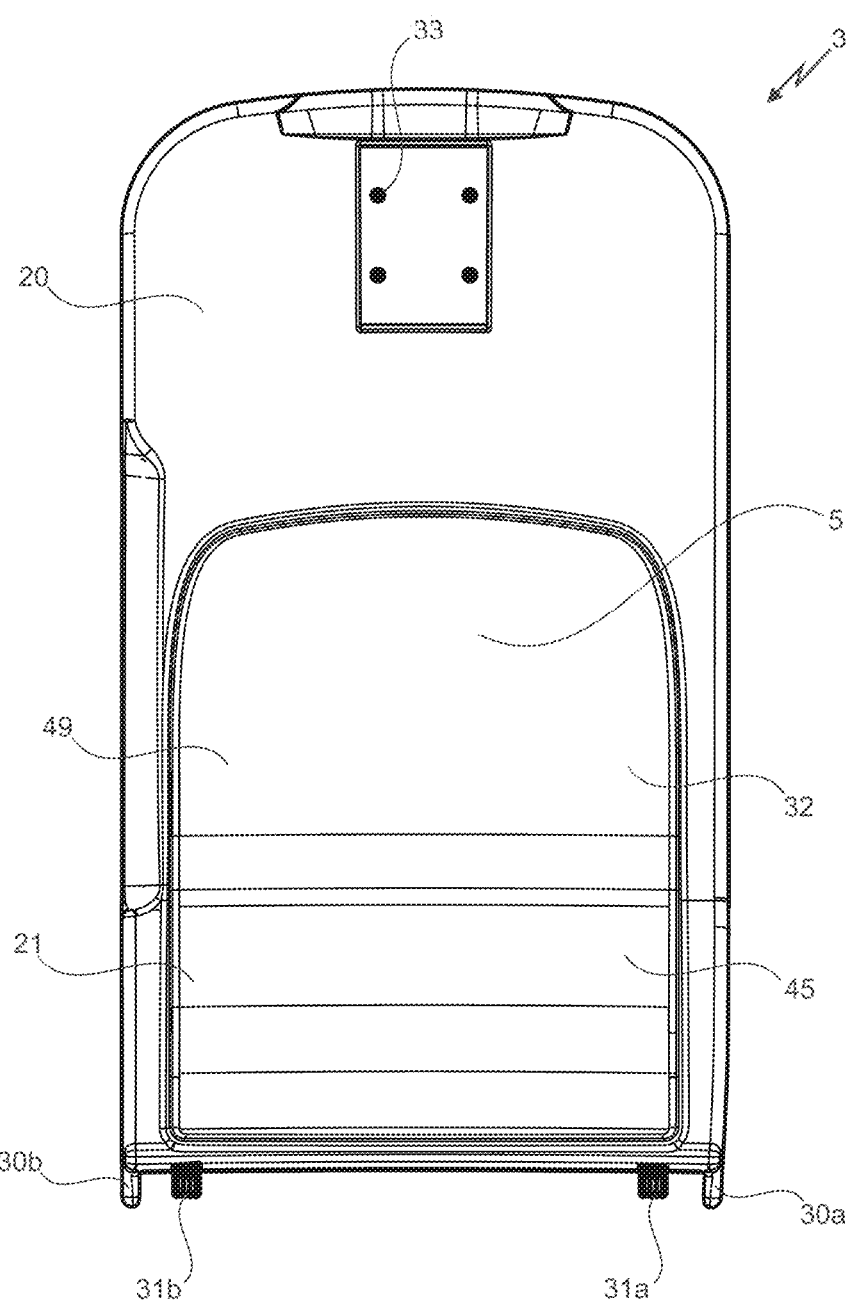
FIG. 3a a front view of a backrest part according to one embodiment.

FIG. 3a shows a front view of a backrest part 3. Here, the knitted fabric 5 can be seen, with the upper section 20 and the lower section 21 comprising the cushion support element 32 arranged in the pocket element 45 within the knitted fabric 5. In the lower section 21 of the knitted fabric 5, in which the upholstery support element 32 is arranged, a front convex area 49 is formed at least in the area of the inner surface 13, which curves forward toward the seat part 2 and protrudes forward beyond the lower area 12 of the frame element 4, creating a cushion-like appearance so that it has the appearance of a cushion placed from the front. In the upper section 20, the four recesses 33 are arranged in a square or rectangular shape. Furthermore, the seat base connecting elements 30a, 30b arranged laterally on the outer side 17b or lower side 17b for connection to the seat base 10 and seat part connecting elements 31a, 31b for connection to the seat part 2 can be seen. The knitted fabric 5 is formed in such a way that the seat foot connecting elements 30a, 30b are each covered or stretched around on the outside by the knitted fabric 5.

Figure 3B:
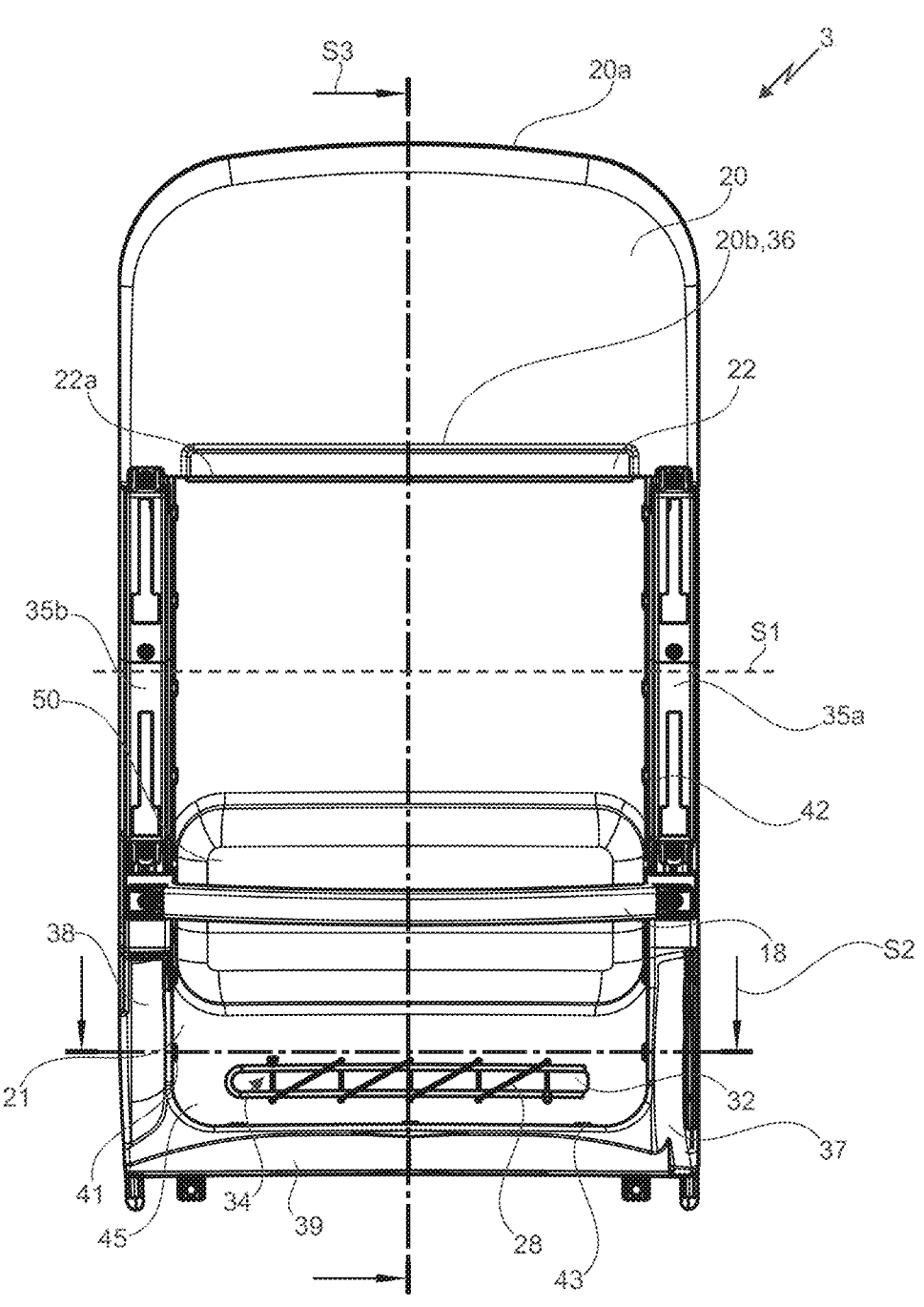
FIG. 3b a rear view of a backrest part according to one embodiment.

FIG. 3b shows a rear view of a backrest part 3. Here, the upper tubular section 20 of knitted fabric is slipped over the upper area 11 of frame element 4 and the fastening elements 22a, 23a, 24a, 25a, 26a, 27a on the fastening units 22, 23, 24, 25, 26, 27 of knitted fabric are connected to the complementary fastening elements 14b, 14c, 41, 42, 43. The fastening units 22, 23, 24, 25 26, 27 are each fastened to the knitted fabric 5 at the edge, in particular sewn on. The upper fastening unit 22 is arranged at an upper edge portion 36 formed at the second opening side 20b, and thus can be connected to the cross strut 14b or inner side 14c of the cross strut 14b as a fastening element. The first 23 and the third lateral fastening units 25 are arranged at a second lateral edge area 38 of the knitted fabric 5. The second 24 and the fourth lateral fastening units 26 are arranged at a first lateral edge area 37 of the knitted fabric 5. The lower fastening unit 27 is arranged at a lower edge area 39 of the knitted fabric 5. In the attached state, the lateral edge areas 37, 38 of the knitted fabric 5 are arranged in such a way that they embrace or span the side struts 15, 16 of the frame element 4 from the front, starting from the front sides 15c, 16c, via the outer sides 15b, 16b and the rear sides 15d, 16d towards the fastening elements 41, 42 on the inner sides 15a, 16a. In the attached state, the lower edge area 39 of the knitting 5 is arranged in such a way that it engages around or spans the cross strut 17 of the frame element 4 from the front, starting from the front side 17c, via the outer sides or the underside 17b and the rear side 17d to the fastening elements 43 on the inner side or top side 17a.

A mounting strip 35a, 35b is arranged on each of the side struts 15, 16 above the knitted fabric 5 and the lateral edge areas 37, 38, respectively, which are preferably screwed to the rear side 15d, 16d. The mounting strips 35a, 35b serve to fasten the backrest part 3. Likewise, on the side struts 15, 16 above the knitted fabric 5 or the lateral edge areas 37, 38, the support strut 18 is in each case connected at the end, preferably screwed to the backs 15d, 16d.

In the lower section 21 of the knitted fabric 5, in the area of the inner surface 13, a rear convex area 50 is formed which curves backwards away from the seat part 2. The back convex area 50 is in the area of the support strut 18, so that when the knitted fabric 5 is loaded by a seat user and the resulting stretching of the knitted fabric 5 occurs with a rearward extension, the back convex area 50 contacts the support strut 18, thereby providing further support for the upper lordosis. Furthermore, the opening 34 in the form of a horizontal slit is shown at the back of the knitted fabric 5, via which the upholstery support element 32 can be inserted into the pocket element 45 in the lower section 21 of the knitted fabric 5, which is at least partially double-layered there. The opening 34 is releasably friction-locked by the cord-like locking element 28, so that the upholstery support element 32 cannot fall out of the pocket element 45 unintentionally.

Figure 4A:
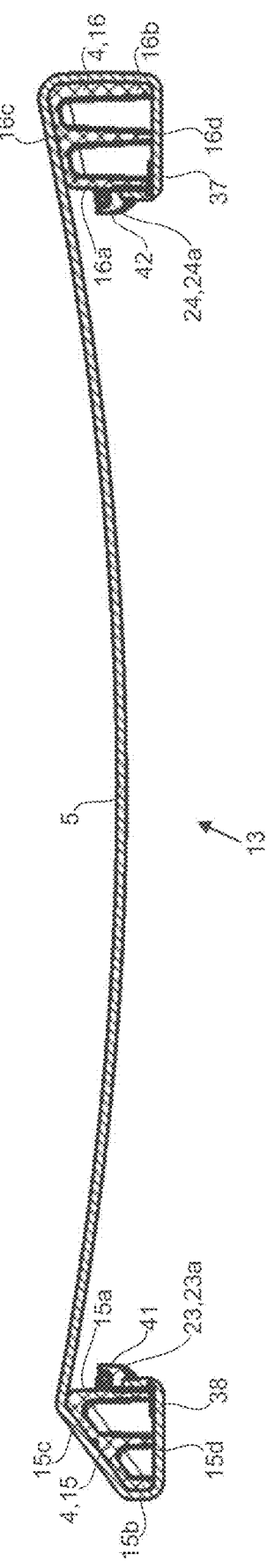
FIG. 4a a sectional view along section S1 of FIG. 3b of a backrest part according to one embodiment.
Figure 4B:
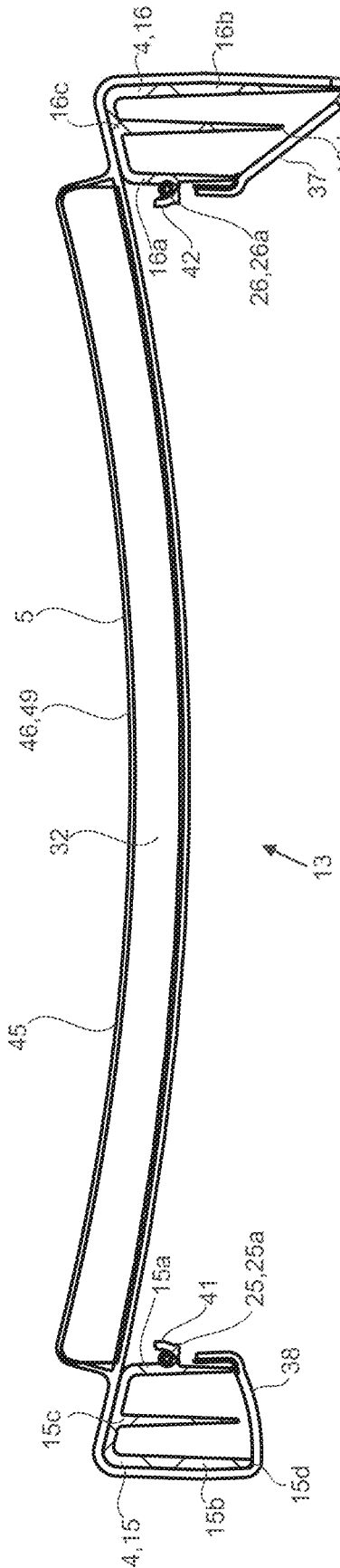
FIG. 4b a sectional view along section S2 from FIG. 3b of an inner backrest part according to one embodiment.
Figure 4C:
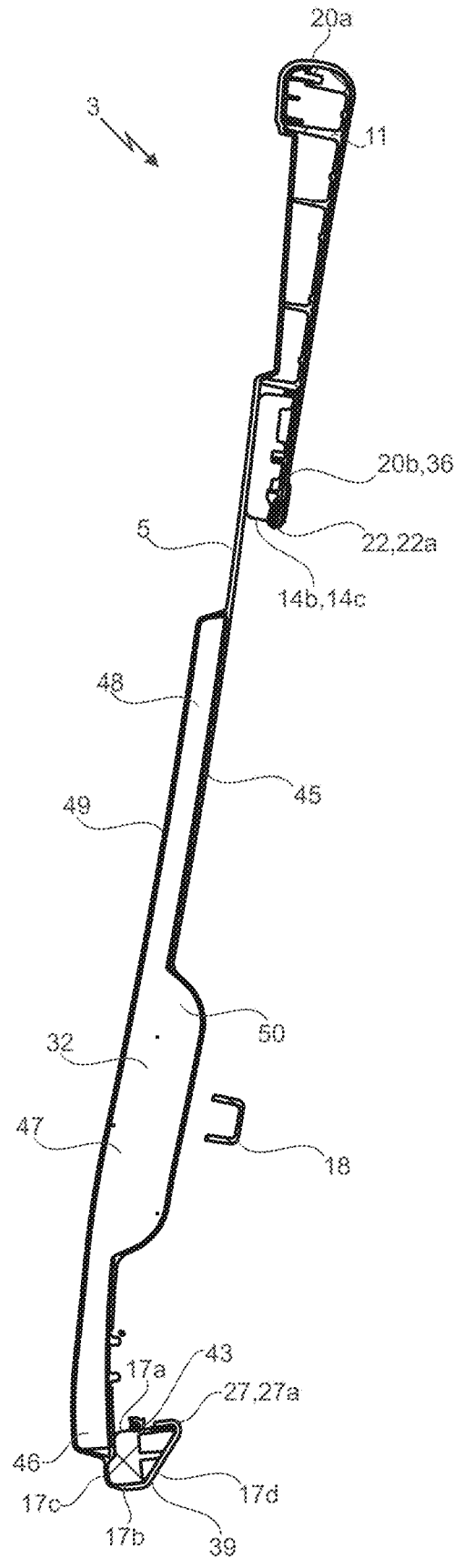
FIG. 4c a sectional view along section S3 from FIG. 3b of an inner back part according to one embodiment.

FIG. 3b also shows three cutting axes S1, S2, S3 indicating the cuts through the backrest part 3 shown in FIGS. 4a-4c.

Figure 3C:
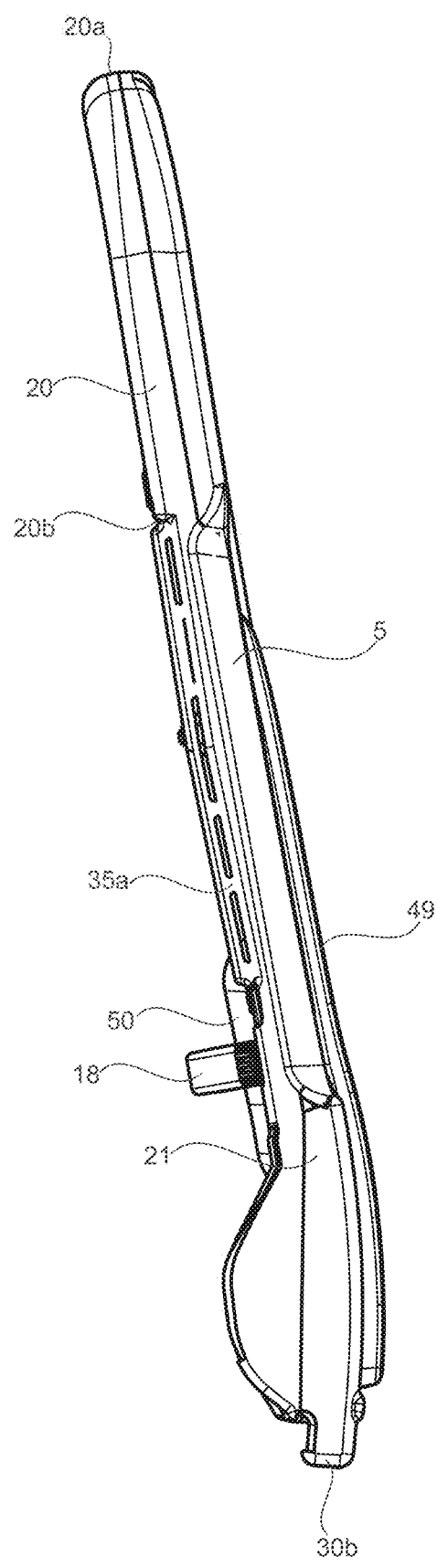
FIG. 3c a side view of a backrest part according to one embodiment.

FIG. 3c shows a side view of the backrest part 3 according to the embodiment of FIGS. 3a and 3b. In this view, the front convex area 49 and the back convex area 50 can be seen.

In each of FIGS. 4a, 4b, 4c, a sectional view of a backrest part 3 is shown along the cutting axes S1, S2, S3 according to FIG. 3b.

In FIG. 4a, the sectional view along the cutting axis S1 is shown, wherein the backrest part 3 or the knitted fabric 5 is shown according to an embodiment that does not have an upholstery support element 32, but is only formed as a single layer. It can be seen how the knitted fabric 5 or the lateral edge areas 37, 38 of the knitted fabric 5 embrace or span the side struts 15, 16 of the frame element 4 from the front, starting from the front sides 15c, 16c, via the outer sides 15b, 16b and the rear sides 15d, 16d towards the fastening elements 41, 42 on the inner sides 15a, 16a. The lower edge area 39 is arranged to embrace or span in a similar manner to the lateral edge areas 37, 38 shown. Essentially, the knitted fabric 5 or the edge areas 37, 38, 39 are deflected by 90°. The knitted fabric 5 is arranged to swing freely in the area of the inner surface 13. In this section, the knitted fabric 5 extends on or over the inner surface 13.

The side struts 15, 16 are formed with recesses, i.e. are not continuous. This makes it possible to use less material and thus reduce weight. The front side 15c of the first side strut 15 slopes from the inner side 15a to the outer side 15b, i.e. the inner side 15a is longer than the outer side 15b. The front side 16c of the second side strut 16 has a downward slope from the outside 16b to the inside 16a, i.e. the outside 16b is longer than the inside 16a.

In FIG. 4b, the section along the cutting axis S2 is shown, wherein the backrest part 3 or the knitted fabric 5 is shown according to an embodiment which has an upholstery support element 32, and at least also in the area of the inner surface 13 is of double-layer design.

In the area of the inner surface 13, the upholstery support element 32 can be seen within the double-layered knitted fabric 5 forming the front convex area 49 which curves forward towards the seat part 2 and projects beyond the frame element 4. In this section shown, the knitted fabric 5 extends on or over the inner surface 13.

The further embodiments shown in FIG. 4b correspond mutatis mutandis to the features described above in FIG. 4a.

In FIG. 4c, the section along the cutting axis S3 is shown, wherein the backrest part 3 or the knitted fabric 5 is shown according to an embodiment that has an upholstery support element 32, and at least also has a double-layered design in the area of the inner surface 13.

In the sectional view of FIG. 4c, the looping of the frame element 4 with the knitted fabric can be seen particularly well. The upper fastening unit 22 is arranged at an upper edge portion 36, which is formed at the second opening side 20b, and is thus positively connected to the cross strut 14b or inner side 14c of the cross strut 14b as a fastening element. The lower fastening unit 27 is arranged on the lower edge area 39 of the knitted fabric 5, and has the fastening elements 27a positively connected to the fastening elements 43 on the inner side 17a of the cross strut 17. In the attached state, the lower edge area 39 of the knitted fabric 5 is arranged in such a way that it embraces or spans the cross strut 17 of the frame element 4 from the front, starting from the front side 17c, via the outer sides or underside 17b and the rear side 17d to the fastening elements 43 on the inner side or top side 17a.

Furthermore, the upholstery support element 32 can be seen within the double-layer knitted fabric 5, which is arranged in the area of the inner surface 13. Here, the front convex area 49 can be seen, which is formed by the entire upholstery support element 32 (all segments 46, 47, 48; see FIGS. 7a-7c) in the knitted fabric 5. The back convex area 50 is formed only in sections (through the middle segment 47; see FIGS. 7a-7c), and the back convex area 50 is located within the inner surface 13 and may also partially overhang it to the rear. The back convex area 50 and/or the middle segment 47 of the cushion support element 32 are arranged at the same height, so that contact is possible. A lower segment 46 of upholstery support element 32 shows a convex curvature towards the front in the direction of seat part 2 (see FIGS. 7a-7c).

Figure 5A:
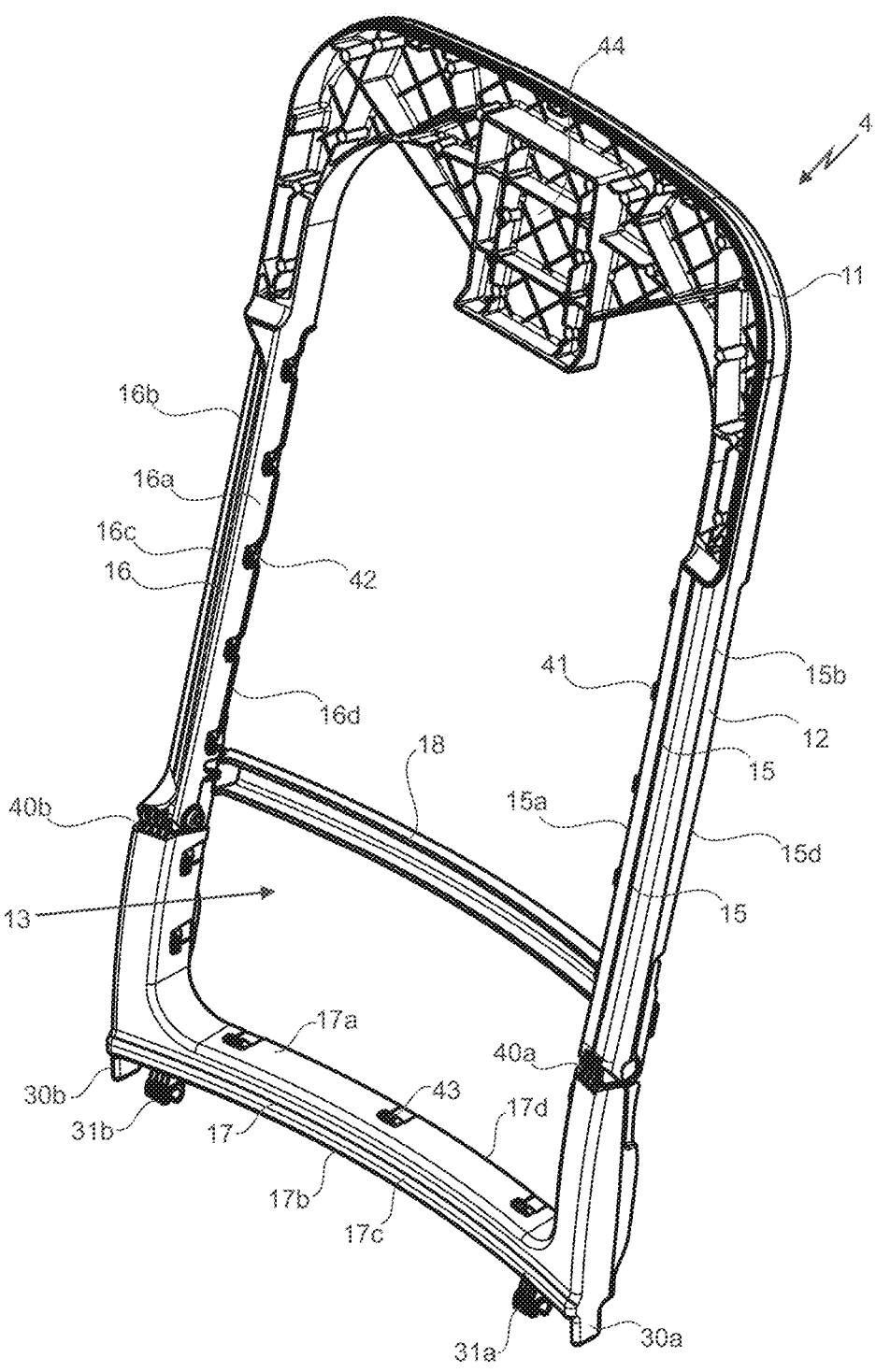
FIG. 5a a perspective view of a frame element according to one embodiment.
Figure 5B:
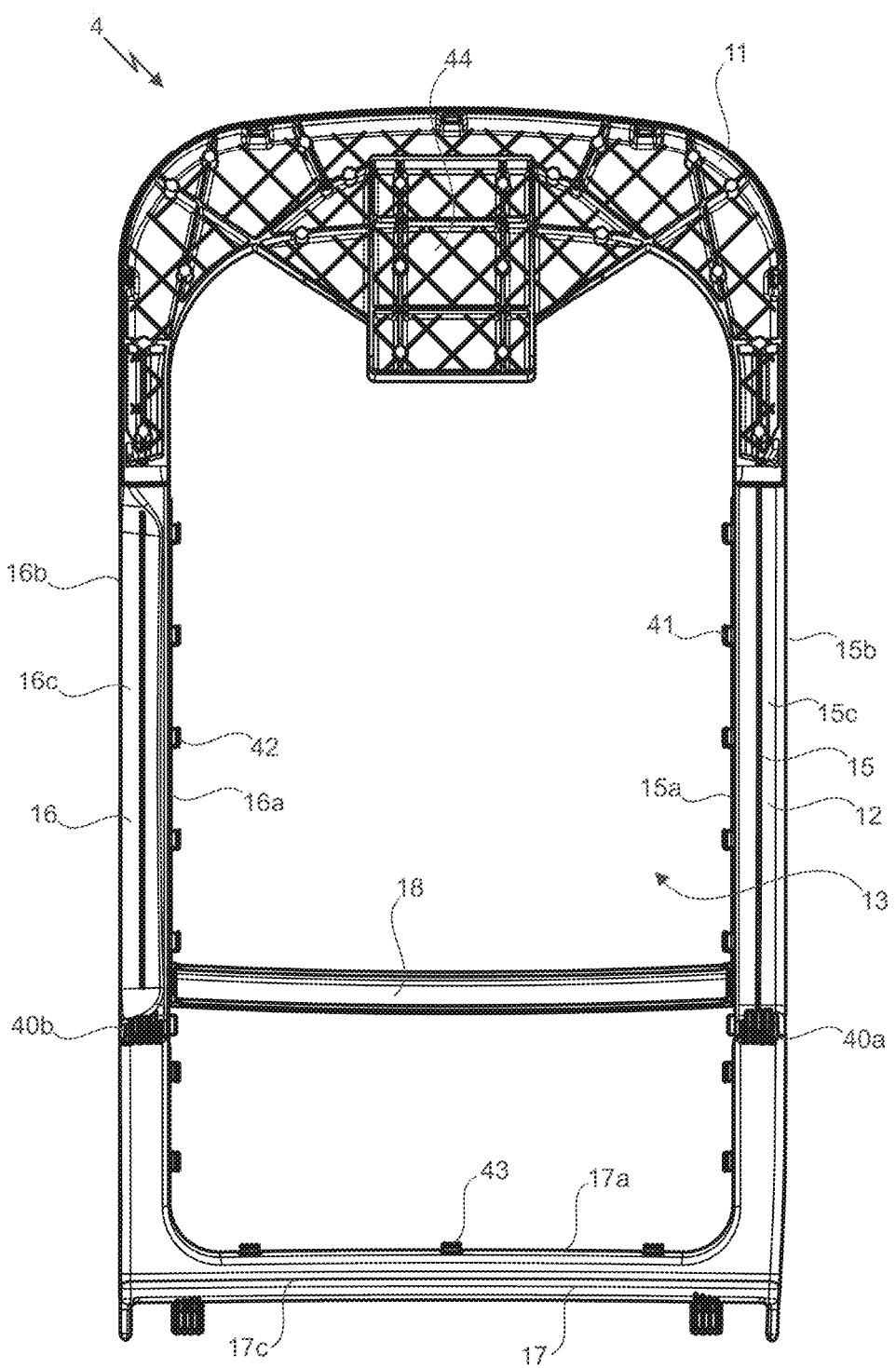
FIG. 5b a front view of a frame element according to one embodiment.
Figure 5C:
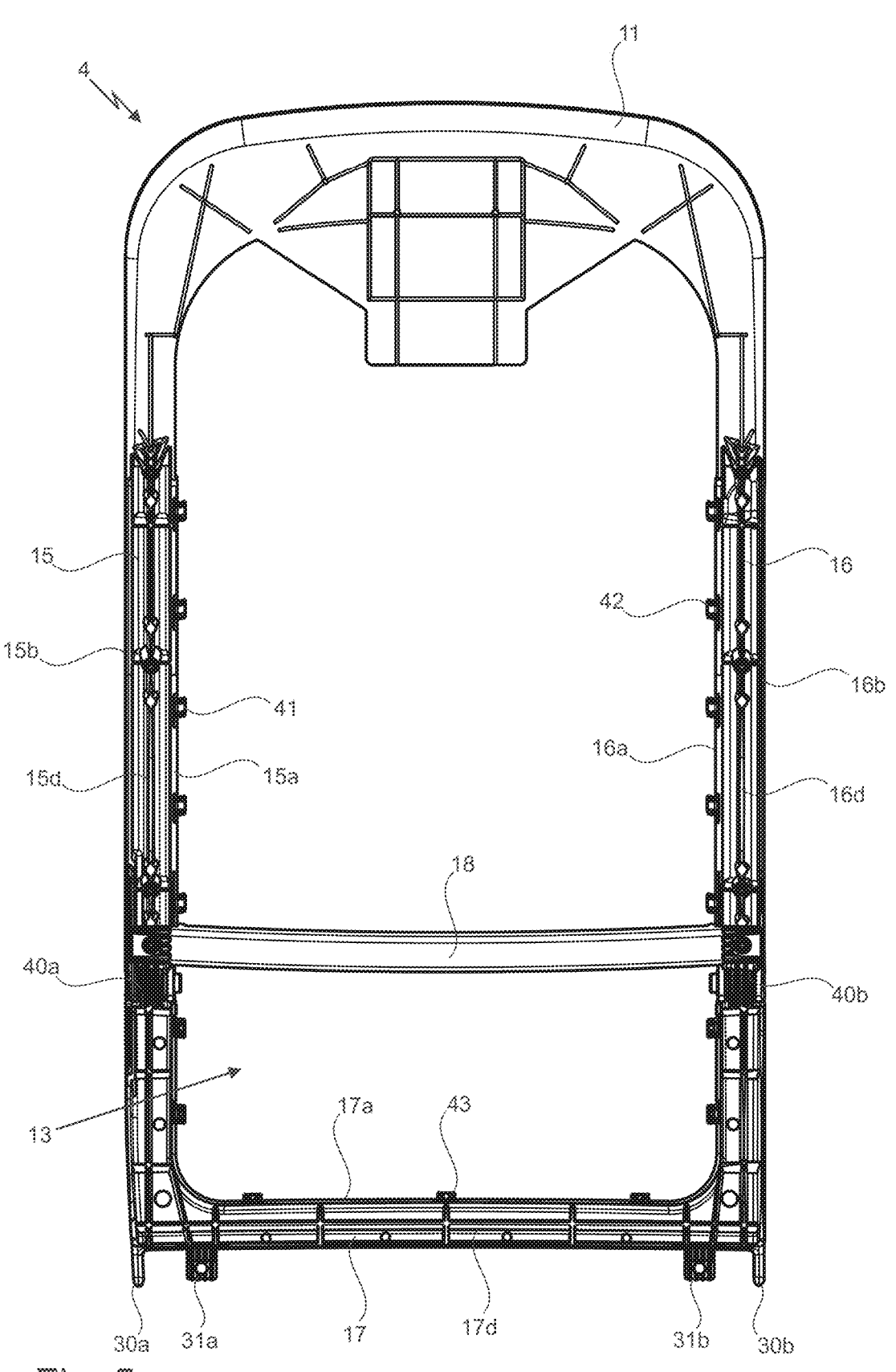
FIG. 5c a rear view of a frame element according to one embodiment.
Figure 5D:
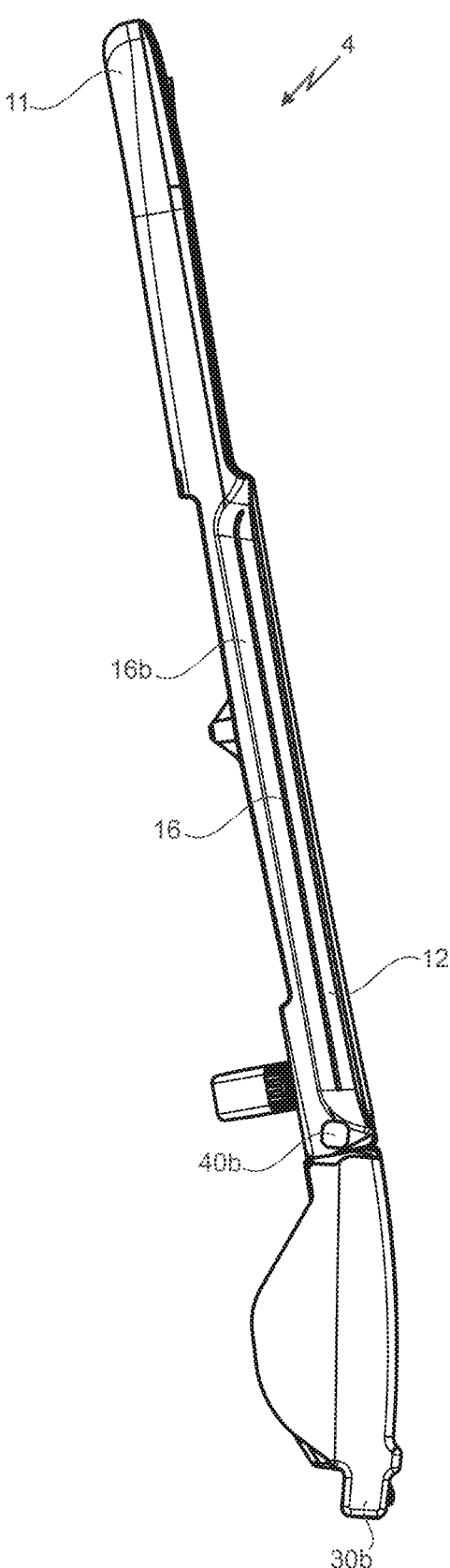
FIG. 5d a side view of a frame element according to one embodiment.

In each of FIGS. 5a, 5b, 5c, 5d, a view of a frame element 4 is shown, with FIG. 5a showing a perspective view, FIG. 5b showing a front view, FIG. 5c showing a rear view, and FIG. 5d showing a side view.

The upper area 11 of frame element 4 in FIGS. 5a-5d is shown only partially with headrest fastening 44 for clarity, but not with cross strut 14b as shown in the exploded view in FIG. 2.

The inner sides 15a, 16a, 17a of the first side strut 15, the second side strut 16 and the cross strut 17 are shown with the fastening elements 41, 42, 43 designed as hooks. The hook-shaped fastening elements 41, 42, 43 project from the inner surfaces 15a, 16a, 17a into the inner surface 13 and point forward in the direction of the seat part 2, so that the complementary fastening elements 23a, 24a, 25a, 26a of the knitted fabric 5 can be hooked in accordingly. The fastening elements 41, 42, 43 are arranged along the entire length of the first side strut 15, the second side strut 16 and the cross strut 17 at the inner sides of 15a, 16a, 17a, whereby several individual fastening elements 41, 42, 43 are provided.

The side struts 15, 16 each have connecting axes 40a, 40b, so that the side struts 15, 16 are formed in two parts, so to speak. This has the advantage that the connected seat part 2 can be pushed back and forth and thus only the lower part of the side struts 15, 16 of the lower area 12 moves along in each case up to the connecting axes 40a, 40b.

Furthermore, the support strut 18 is arranged, which is connected at each end to the rear sides 15d, 16d of the side struts 15, 16 and runs behind the inner surface 13. The supporting strut 18 has a stabilizing effect and additional a supporting function in cooperation with the back convex area 50 and the middle segment 47, respectively.

Figure 6A:
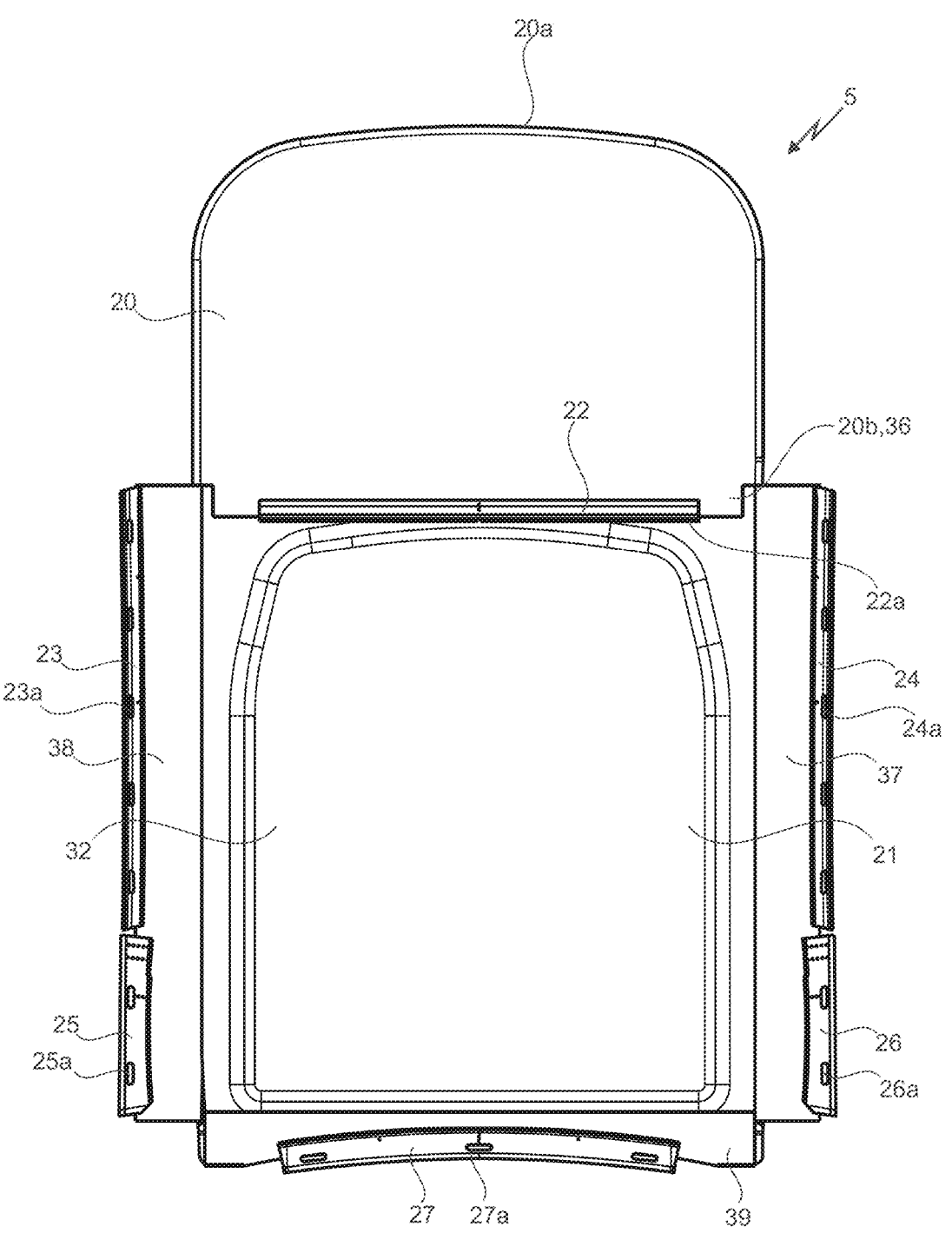
FIG. 6a a rear view of a knitted fabric according to one embodiment.
Figure 6B:
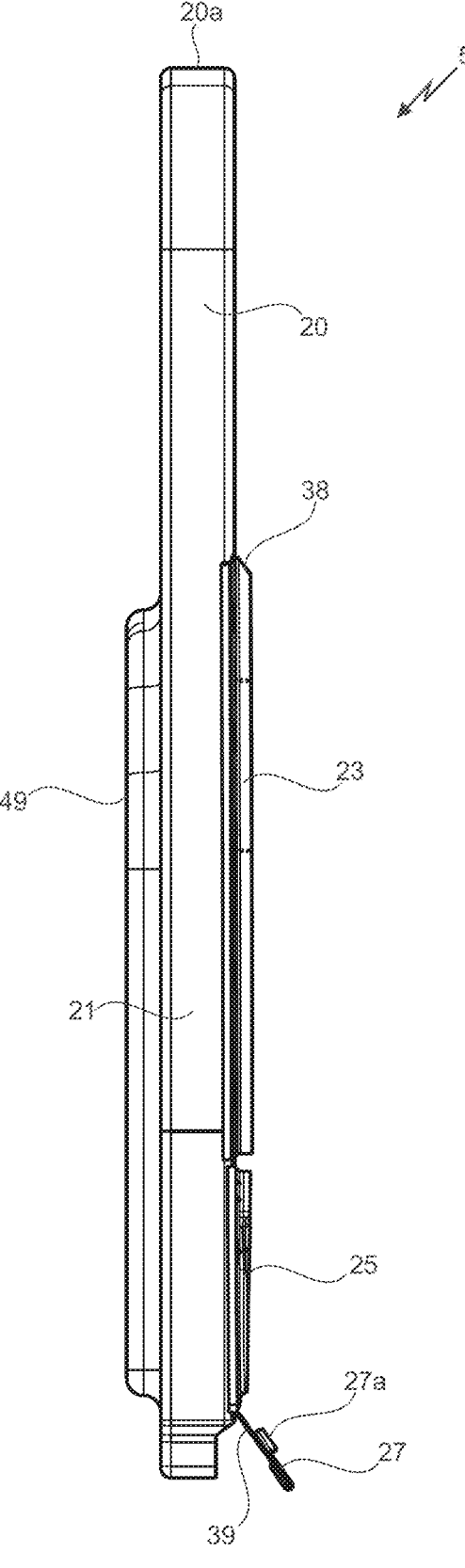
FIG. 6b a side view of a knitted fabric according to one embodiment.

FIGS. 6a and 6b show a knitted fabric 5 according to one embodiment in an unattached state, so that only the knitted fabric 5 can be seen before the frame element 4 is restrained.

FIG. 6a shows a rear view of the knitted fabric 5 in a spread-out state. The knitted fabric has the upper tubular section 20 with the two opening sides 20a, 20b, the first opening side 20a being closed, and the lower section 21 which is substantially flat and directly adjacent to the front of the upper section 20.

The fastening units 22, 23, 24, 25, 26, 27 are each fastened, in particular sewn, to the knitted fabric 5 on the edge side. The upper fastening unit 22 is arranged at the upper edge portion 36 formed at the second opening side 20b. The first 23 and the third lateral fastening units 25 are arranged at the first lateral edge area 38 of the knitted fabric 5. The second 24 and the fourth lateral fastening units 26 are arranged at a second lateral edge area 37 of the knitted fabric 5. The lower fastening unit 27 is arranged at the lower edge area 39 of the knitted fabric 5.

The fastening units 22, 23, 24, 25, 26, 27 have fastening elements 22a, 23a, 24a, 25a, 26a, 27a arranged on the knitted fabric. The fastening units 22, 23, 24, 25, 26, 27 are formed in a strip-like manner, the fastening elements 22a, 23a, 24a, 25a, 26a, 27a arranged on the fastening units 22, 23, 24, 25a, 26a, 27a projecting beyond a base surface of the knitted fabric 5. The fastening element 22a on the upper fastening unit 22 is formed in a strip-like manner. The fastening elements 23a, 24a, 25a, 26a, 27a are formed in a hole shape so that they can be positively connected to the complementary hook-shaped fastening elements 41, 42, 43 of the frame element 4. The fastening units 23 and 24 and the fastening units 25 and 26 are each arranged opposite one another on the knitted fabric 5. The edge areas 37, 38, 39 are of wing-like design so that they can be easily folded around the struts 15, 16, 17 for reclam ping the frame element 4.

In FIG. 6b, a side view of the knitted fabric 5 is shown. From this view, the front convex area 49 can be seen to bulge out toward the seat part 2 and stand out from the rest of the knitted fabric 5 toward the front. The upholstery support element 32 stabilizes or fills the area 49.

Figure 7A:
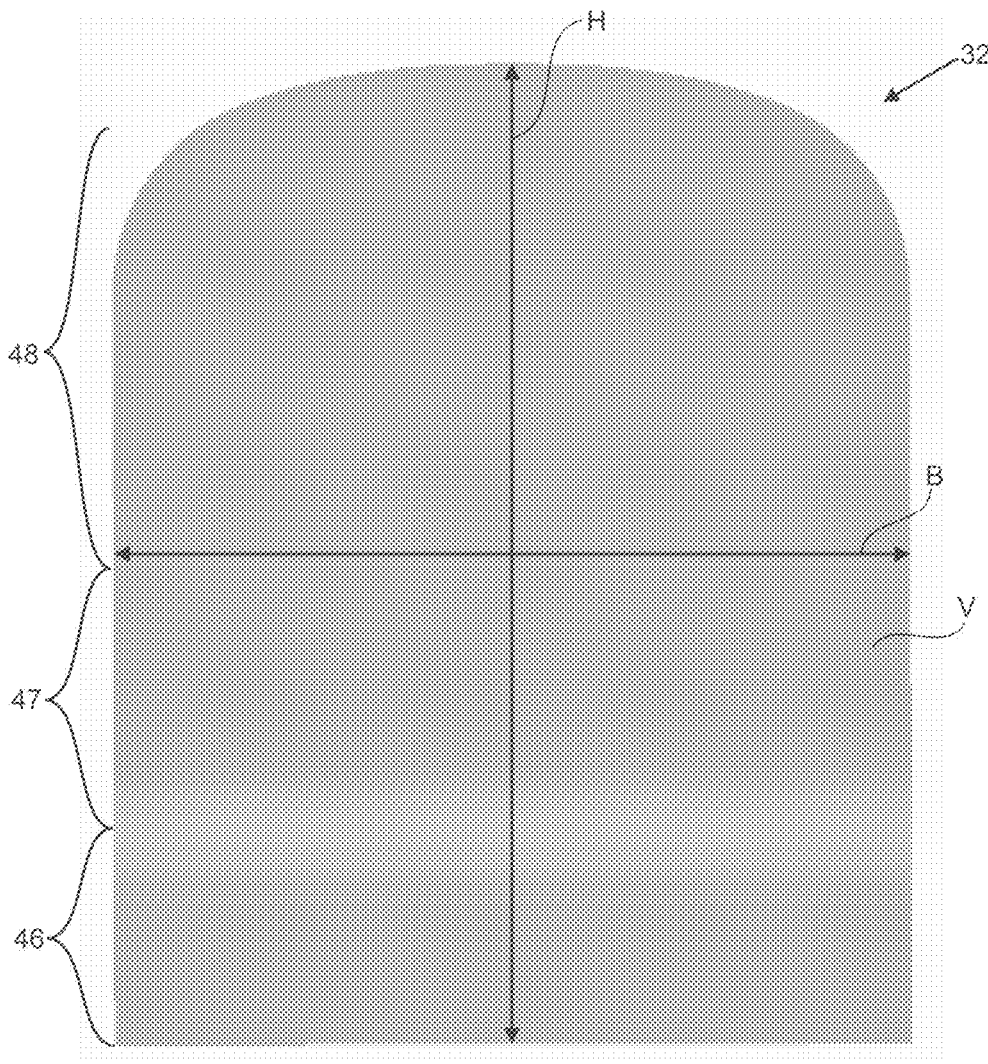
FIGS. 7a-c various views of an upholstery support element according to one embodiment.
Figure 7B:
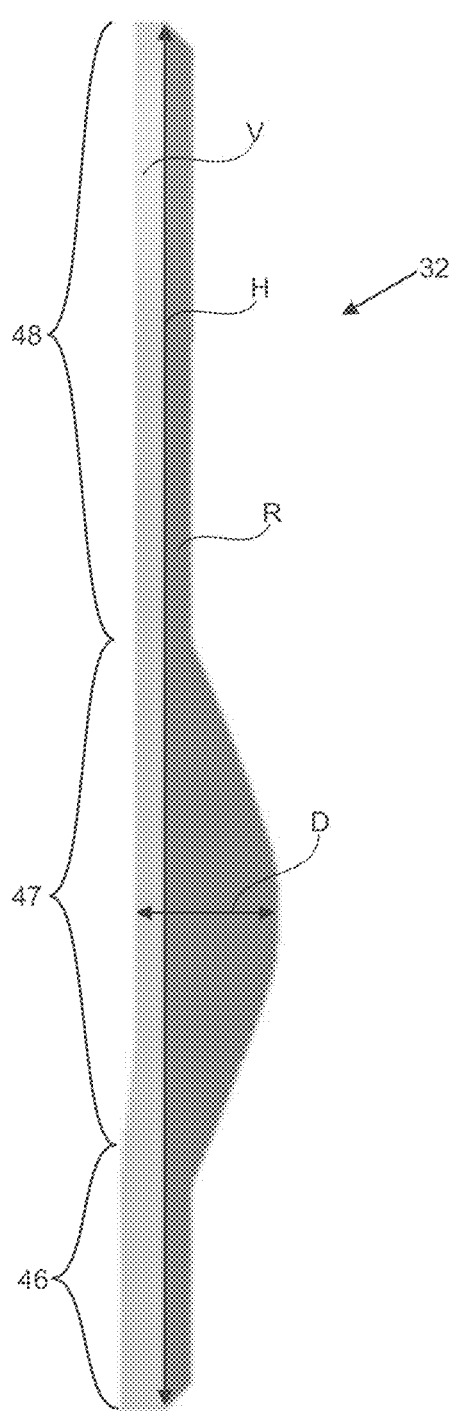
Figure 7C:
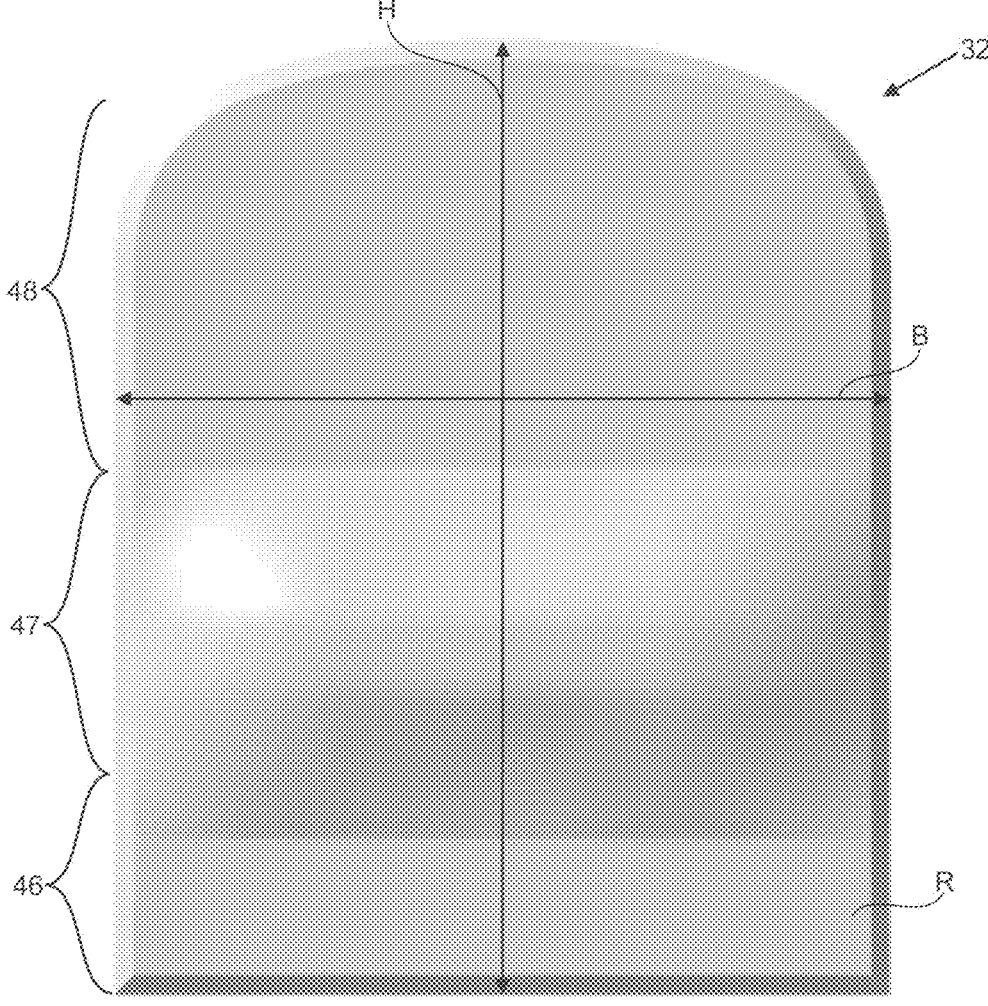

In FIGS. 7a, 7b and 7c, an upholstery support element 32 is shown in various views. The cushion support element 32 has a height H, a width B and a thickness D (the thickness may also be referred to as depth).

In FIG. 7a, the upholstery support element 32 is shown from the front. In this case, the front side V of the cushion support element 32, in the installed or inserted state in the knitted fabric 5, points forward in the direction of the seat part 2.

In FIG. 7b, the upholstery support element 32 is shown from the side. Here, the thickness D of the cushion support element 32 can be seen.

In FIG. 7c, the upholstery support element 32 is shown from the rear. The rear side R of the cushion support element 32 points to the rear in the installed or fitted state in the knitted fabric 5.

The cushion support element 32 has a lower segment 46, a middle segment 47 and an upper segment 48, the segments 46, 47, 48 being arranged in said row with respect to the height H of the cushion support element 32 from bottom to top.

The segments 46, 47, 48 form the front convex area 49 of the knitted fabric 5. The middle segment 47 forms the back convex area 50 of the knitted fabric.

As can be seen in particular in FIGS. 7b and 7c, the cushion support element 32 has a varying thickness D over the height H and also over the width B. The lower segment 46 is convex in shape and curves forward toward the seat part 2, while the middle segment 47 is also convex in shape but curves rearward. The lower segment 46 has a uniform thickness D over the entire width B of the cushion support element 32, which tapers, i.e., decreases, in height H toward the top. The middle segment 47 has a thickness D that tapers outwardly with respect to the width B and the height H, i.e., the middle segment 47 has the greatest thickness D in the middle that decreases in height H and width B. The upper segment 48 has a uniform thickness D. By the shown embodiment of the upholstery support element 32, the lower segment 46 ensures support of the lower lordosis and the middle segment 47 ensures support of the upper lordosis.

The upholstery support element 32 is substantially rect-angular in shape, with the upper corners, relative to the height H, being rounded.

Figure 8:
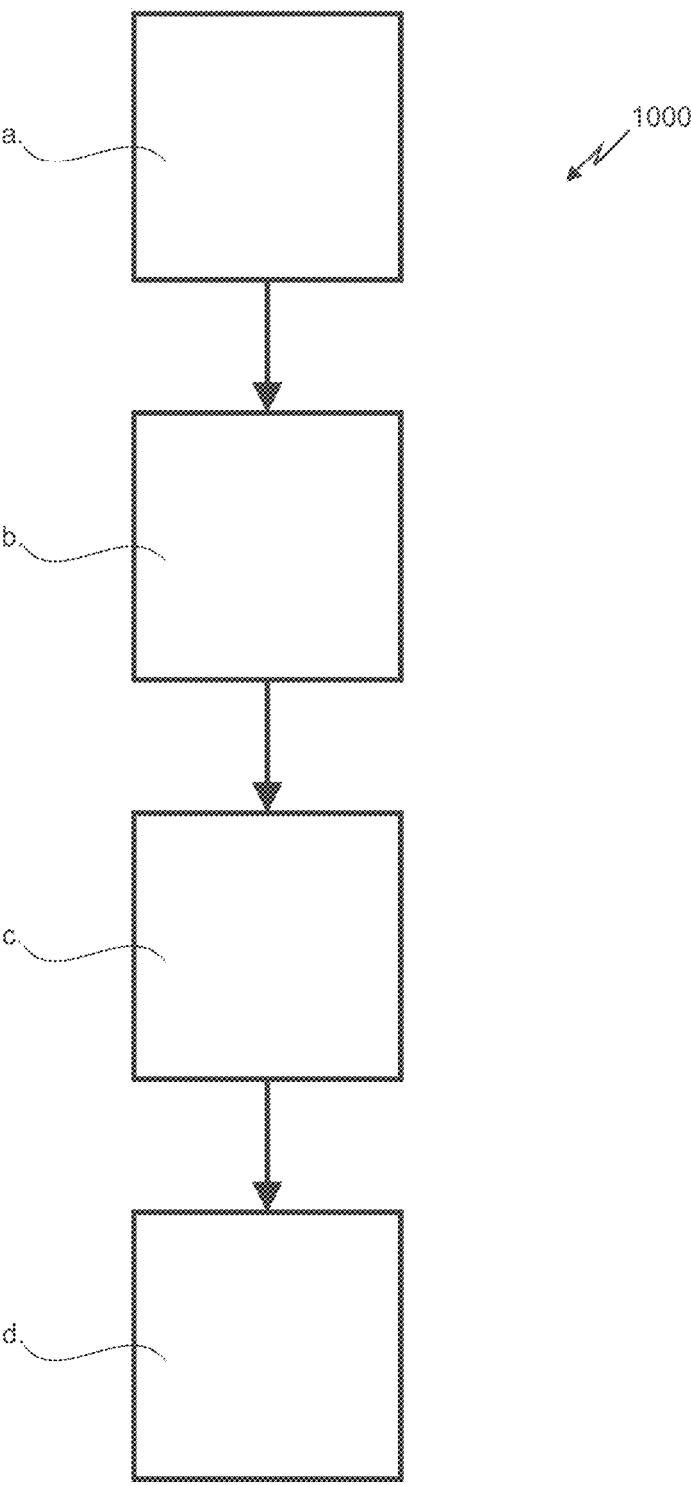
FIG. 8 a method according to one embodiment.

In FIG. 8, a method 1000 for manufacturing a backrest part 3 for a vehicle seat 1 is shown, comprising at least the following steps:

a. Providing a frame element 4 and a knitted fabric 5, the frame element 4 having at least one fastening element 14b, 14c, 41, 42, 43 on each of at least two opposite inner sides 14c, 15a, 16a, 17a, and the knitted fabric 5 having a fastening elements 22a, 23a, 24a, 25a, 26a, 27a in each case, which is formed complementary thereto and is arranged on the rear side;
  b. Applying the knitted fabric 5 to the frame element 4 at a front side of the frame element 4 facing the seat part 2;
  c. Fastening the knitted fabric 5 to the frame element 4 by the fastening elements 14b, 14c, 15a, 16a, 17a, 22a, 23a, 24a, 25a, 26a, 27a, so that the knitted fabric 5 at least partially embraces the frame element 4 from the outside inwards;
  d. Obtaining the backrest part 3 with the knitted fabric 5 at least partially embracing the frame element 4.

The step b. of applying the knitted fabric 5 to the frame element 4 comprises folding over an upper tubular section 20 of knitted fabric 5 having two opening sides 20a, 20b, a first opening side 20a being closed, the upper tubular section 20 of knitted fabric 5 being arranged to surround the upper area 11 of frame element 4, the upper area 11 being continuous and serving to support the head.

The step c. of fastening the knitted fabric 5 to the frame element 4 comprises first fastening the fastening elements 27a of the knitted fabric 5 arranged at the lower edge section 21 (at the lower edge area 39) to the complementary fastening elements 43 of the frame element 4 at the lower inner side 17a of the lower area 12 of the frame element 4. Thereafter, the fastening elements 23a, 24a, 25a, 26a of the knitted fabric 5 arranged at the lower section 21 at the edge side (first and second lateral edge area 37, 38) are fastened to the complementary fastening elements 42, 43 of the frame element 4 at the lateral inner sides 15a, 16a, i.e. left and right, of the lower section 12. Finally, the fastening element 22a of the knitted element 5 at the upper section 11 is then fastened at the rear edge side (upper edge area 36) at the open second opening side 20b of the upper tube-like section 20 to the fastening unit (cross strut and inner side of the upper area) 14b, 14c of the frame element 4, which bounds the inner surface 13 at the top.

Figure 9:
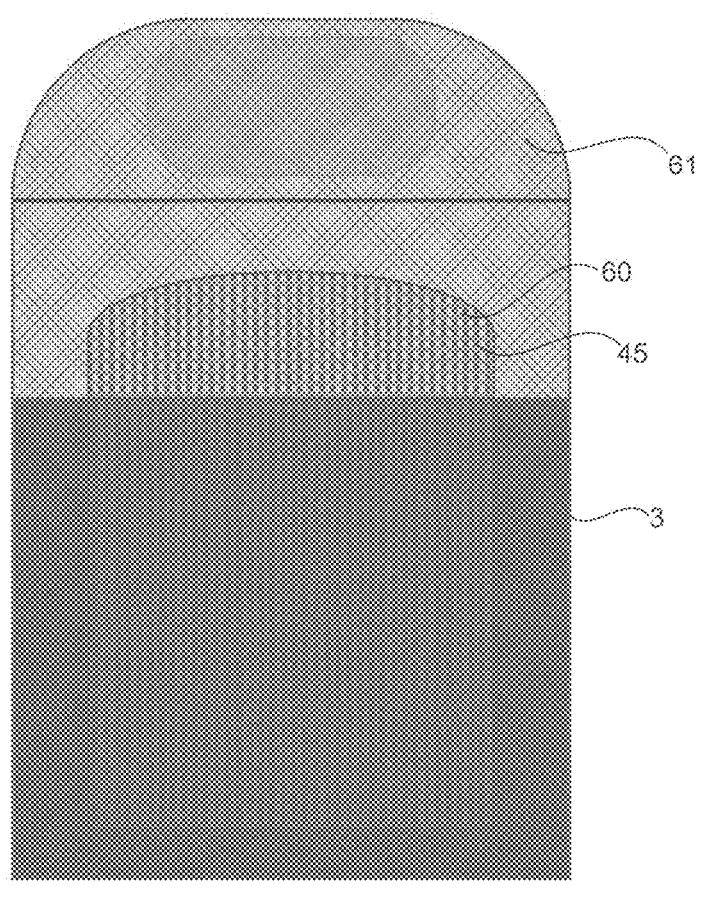
FIG. 9 a possible use of different knitted fabrics, shown schematically.
Figures 10A, 10B, 10C:
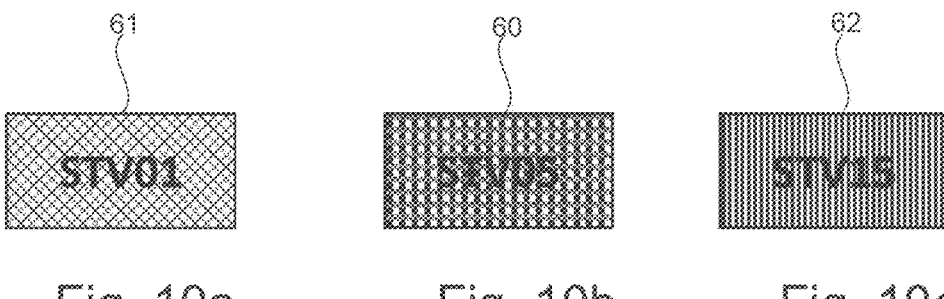
FIGS. 10a-c different knitting patterns.

In the FIG. 9, the backrest part 3 is schematically shown in a front view and shows that different knitted fabrics 5 are shown in different areas by different kinds of patterns or knitting patterns. In the area of the pocket element 45 when viewed from the front, i.e. facing a person sitting on the seat, a first knit pattern 60 is shown. In the further area around the pocket element 45, a second knitting pattern 61 is provided. Further, in the rear area of the pocket element 45, it is provided to provide a third knitting pattern 62. The knitting patterns 60, 61, 62 are shown in more detail in further FIGS. 10a, 10b and 10c.

The use of different knitting patterns 60, 61, 62 can be advantageous, since they are adapted to the respective field of application. The pocket element 45 is always in contact with the person and should therefore be as abrasion-resistant as possible. In the rear area to this end, increased stretch-ability is advantageous in order to take account of the force exerted by the person on the knitted fabric 5.

All features disclosed in the application documents are claimed to be essential to the invention insofar as they are new, individually or in combination, compared to the prior art.

LIST OF REFERENCE SIGNS

1 Vehicle seat
  100 Interior design
  1000 Method
  2 Seat part
  3 Backrest part
  4 Frame element
  5 Knitted fabric
  8 Armrest
  9 Headrest
  10 Vehicle seat base
  11 Upper area of frame element
  12 Lower area of frame element
  13 Inner surface
  14a Upper area of the upper section
  14b Cross strut of upper area or fastening element
  14c Inner side of cross strut of the upper area
  15 First side strut of lower section
  15a Inner side of first side strut
  15b Outer side of the first side strut
  15c Front side of first side strut
  15d Rear side of the first side strut
  16 Second side brace of lower section
  16a Inner side of second side strut
  16b Outside of second side strut 16c Front side of second side strut
16d Rear side of second side strut
17 Cross strut of the lower section
17a Inner side of cross strut
17b Outer side of cross strut
17c Front side of cross strut
17d Rear side of cross strut
18 Support strut
19 Foam insert
20 Upper section of knitted fabric
20a First opening side
20b Second opening side
21 Lower section of the knitted fabric
22 Upper fastening unit
22a Fastening element
23 First lateral fastening unit
23a Fastening element
24 Second lateral fastening unit
24a Fastening element
24 Third lateral fastening unit
25a Fastening element
26 Fourth lateral fastening unit
26a Fastening element
27 lower fastening unit
27a Fastening element
28 Locking element
29 Headrest recess
30a, b Seat base connecting element
31a, b Seat part connecting element
32 Upholstery support element
33 Recess
34 Opening
35a, b Mounting strips
36 Upper edge area of knitted fabric
37 First lateral edge area of the knitted fabric
38 Second lateral edge area of the knitted fabric
39 Lower edge area of the knitted fabric
40a, b Connecting axis
41 Fastening element on the inside of the first side strut
42 Fastening element at the inner side of second side strut
43 Fastening element on the inside of the cross strut
44 Headrest fastening
45 Pocket element
46 Lower segment of upholstery support element
47 Middle segment of upholstery support element
48 Upper segment of upholstery support element
49 Front convex area
50 Back convex area
60 First knitting pattern
61 Second knitting pattern
62 Third knitting pattern
D Thickness of the cushion support element
H Height of the cushion support element
B Width of the cushion support element
V Front side of the cushion support element
R Back of the cushion support element
a.-d. Steps
S1, S2, S3 Cutting axis

What is claimed is:

1. A vehicle seat having a seat part and a backrest part, wherein the backrest part comprises a frame element including an inner surface and a knitted fabric arranged on the frame element,
    wherein the frame element has at least one fastening element on each of at least two opposite inner sides, and the knitted fabric has a fastening element formed complementarily thereto and arranged on a rear side in each case, the knitted fabric being fastened to the frame element by the fastening elements in such a way that, starting from a front side of the frame element facing the seat part, the knitted fabric engages around the frame element at least partially from the outside inwards and is essentially completely tensioned, and
    wherein at least six fastening units are fixedly arranged on the knitted fabric, wherein each of the fastening units includes at least one of the fastening elements,
    wherein the fastening elements of the fastening units are arranged on the knitted fabric,
    wherein the fastening units are fastened, in particular sewn on, to the knitted fabric on an edge side, in particular opposite one another,
    wherein, being of strip-like design, the fastening elements arranged on the fastening units project beyond a base surface of the knitted fabric,
    wherein the knitted fabric has an upper tubular section of the knitted fabric with two opening sides, a first opening side being closed, and the upper tubular section of the knitted fabric is arranged to surround the upper area of the frame element,
    wherein the fastening elements of the knitted fabric are formed in a hole shape so that they can be positively connected to the complementary hook-shaped fastening elements of the frame element, and
    wherein edge areas of the knitted fabric are of a wing-like design so that they can be easily folded around struts for reclamping the frame element.

2. The vehicle seat according to claim 1, wherein the knitted fabric is arranged in a free-swinging manner on the front side of the frame element at least in the area of the inner surface, wherein the knitted fabric is arranged in the area of the inner surface either on or above the inner surface or is arranged in sections on or above and inside the inner surface, and wherein the knitted fabric provides the sole support and/or cushioning for a seat user at least in the area of the inner surface.

3. The vehicle seat according to claim 1, wherein the frame element encloses a continuous upper area for supporting the head and a lower area having the inner surface for supporting the back, wherein one inner side of the upper area delimits the inner surface from above and three inner sides of the lower area delimits the inner surface laterally and from below, wherein the frame element has at least one fastening element on each of the inner sides delimiting the inner surface, and wherein the fastening elements on the frame element and the knitted fabric are designed in such a way that the fastening of the knitted fabric to the frame element can be released without being destroyed.

4. The vehicle seat according to claim 1, wherein the fastening elements on the frame element are in the form of at least one of hooks, strips, hook-and-loop fasteners, zip fasteners or press studs, and wherein at least one of a plurality of different types of fastening elements or only one type of fastening element is provided, in which case at least one of a plurality of fastening elements or one continuous fastening element is arranged on the inner sides of the frame element and distributed over the length of the inner side.

5. The vehicle seat according to claim 1, wherein the knitted fabric has a lower section which is essentially planar and directly adjoins the upper section at a front, and wherein the lower section contacts a lower area of frame element from the front and, starting from the front of the frame element, at least partially embraces it from the outside inwards.

6. The vehicle seat according to claim 5, wherein the complementary fastening elements of the knitted fabric are arranged on a rear edge side of the open second opening side on the upper section as well as on the side and a bottom edge side of the lower section.

7. The vehicle seat according to claim 1, wherein interior equipment of a means of transport, in particular a means of passenger transport, comprising at least one vehicle seat.

8. A method of manufacturing a backrest part for a vehicle seat according to claim 1, comprising at least the following steps:

a. Providing a frame element and a knitted fabric, the frame element having at least one fastening element on each of at least two opposite inner sides and the knitted fabric having a fastening element complementary thereto and arranged on the rear side;

b. Placing the knitted fabric against the frame element on a front side of the frame element facing the seat part;

c. Fastening the knitted fabric to the frame element by the fastening element so that the knitted fabric at least partially embraces the frame element from the outside to the inside;

d. Obtaining the backrest part with the knitted fabric at least partially embracing the frame element, wherein at least six fastening units are fixedly arranged on the knitted fabric, wherein the fastening units include the fastening elements arranged on the knitted fabric such that each fastening unit comprises at least one fastening element, the fastening units being fastened, in particular sewn on, to the knitted fabric on an edge side, in particular opposite one another, and being of strip-like design, the fastening elements arranged on the fastening units projecting beyond a base surface of the knitted fabric.

* * * * *